US009648531B2

(12) United States Patent
Sergeev et al.

(10) Patent No.: US 9,648,531 B2
(45) Date of Patent: May 9, 2017

(54) COMMUNICATION SERVICES TO A MOVING PLATFORM

(71) Applicant: ECI Telecom Ltd., Petach Tikva (IL)

(72) Inventors: Andrew Sergeev, Kfar Saba (IL); Asher Besserglick, Kiryat Ono (IL); Oded Mann, Raanana (IL)

(73) Assignee: ECI TELECOM LTD., Petach Tikva (IL)

( * ) Notice: Subject to any disclaimer, the term of this patent is extended or adjusted under 35 U.S.C. 154(b) by 461 days.

(21) Appl. No.: 14/160,826

(22) Filed: Jan. 22, 2014

(65) Prior Publication Data
US 2014/0204906 A1    Jul. 24, 2014

(30) Foreign Application Priority Data

Jan. 20, 2013   (IL) .......................................... 224331

(51) Int. Cl.
*H04W 36/18* (2009.01)
*H04W 36/00* (2009.01)
(Continued)

(52) U.S. Cl.
CPC ....... *H04W 36/18* (2013.01); *H04W 36/0027* (2013.01); *H04W 28/0226* (2013.01); *H04W 40/36* (2013.01)

(58) Field of Classification Search
CPC ............. H04W 36/0027; H04W 36/18; H04W 28/0226; H04W 3/00; H04W 3/22;
(Continued)

(56) References Cited

U.S. PATENT DOCUMENTS 5,420,883 A *  5/1995  Swensen ................. B61L 3/125
                                                         342/450
7,188,341 B1 *  3/2007  Hawthorne ............. B61L 3/125
                                                         455/525
(Continued)

FOREIGN PATENT DOCUMENTS

CN            101820655 A      9/2010
CN      WO2012/092779    *  7/2012  ............. H04L 12/46

OTHER PUBLICATIONS

Wikipedia: VPLS definition.*

*Primary Examiner* — Warner Wong
(74) *Attorney, Agent, or Firm* — Browdy and Neimark, PLLC (57) ABSTRACT

A method and apparatus are described for providing communication services to a mobile platform while moving, wherein the mobile platform communicates along two current communication links extending between the mobile platform and two network gateways. The method comprises: setting an H-VPLS service to enable provisioning of L2 services to the moving platform via at least one of the two current communication links; enabling the moving platform to exchange communications along one or both communication links; replacing one of the two current communication links while the mobile platform is moving, with another communication link extending towards a third network gateway, by using Pseudo Wire Redundancy (PWR) to re-route traffic from the communication link being replaced to the other communication link, thereby allowing the moving platform to continue provisioning the L2 services while communicating with two network gateways, being the third network gateway and one of the former two network gateways.

15 Claims, 6 Drawing Sheets

FIBER CONNECTIVITY
- - - - LOGICAL CONNECTIVITY PROVIDED BY L2 SERVICE PER TRAIN
— · — · — RADIO LINK OVER BAND X
·········· RADIO LINK OVER BAND Y (51) Int. Cl.
*H04W 40/36* (2009.01)
*H04W 28/02* (2009.01)

(58) Field of Classification Search
CPC ....... H04W 3/0005; H04W 3/32; H04W 3/12; H04W 3/08; H04W 40/36; H04W 47/767
See application file for complete search history.

(56) References Cited

U.S. PATENT DOCUMENTS

| | | | | |
|---|---|---|---|---|
| 8,958,396 | B2* | 2/2015 | Ishihara | B60L 15/40 370/329 |
| 2005/0272431 | A1* | 12/2005 | Katori | H04W 16/00 455/446 |
| 2007/0082672 | A1* | 4/2007 | Fujioka | H04B 7/26 455/436 |
| 2009/0066329 | A1* | 3/2009 | Kanda | G01R 33/5676 324/309 |
| 2009/0184211 | A1* | 7/2009 | Groves, Jr. | B61L 27/0038 246/3 |
| 2009/0268607 | A1* | 10/2009 | Wang | H04L 45/02 370/218 |
| 2009/0285178 | A1* | 11/2009 | Chin | H04L 5/0007 370/331 |
| 2010/0020764 | A1* | 1/2010 | Yamamoto | H04W 36/245 370/331 |
| 2011/0134878 | A1* | 6/2011 | Geiger | H04W 48/20 370/330 |
| 2011/0230197 | A1* | 9/2011 | Wu | H04W 72/04 455/450 |
| 2011/0267969 | A1* | 11/2011 | Ceccherini | H04W 36/0083 370/252 |
| 2011/0269404 | A1* | 11/2011 | Hu | H01Q 23/00 455/67.11 |
| 2012/0147864 | A1* | 6/2012 | Guo | B66B 13/22 370/338 |
| 2012/0147879 | A1* | 6/2012 | Guo | H04W 72/1242 370/350 |
| 2013/0150043 | A1* | 6/2013 | Park | H04W 16/32 455/436 |
| 2013/0303081 | A1* | 11/2013 | Chang | H04W 36/0061 455/11.1 |
| 2014/0031044 | A1* | 1/2014 | Mazzarella | H04W 36/245 455/440 |
| 2014/0057634 | A1* | 2/2014 | Chang | H04W 36/32 455/437 |
| 2014/0313969 | A1* | 10/2014 | Kalhan | H04W 36/0072 370/312 |

* cited by examiner

———— FIBER CONNECTIVITY
– – – – LOGICAL CONNECTIVITY PROVIDED BY L2 SERVICE PER TRAIN
— · — · — RADIO LINK OVER BAND X
·············· RADIO LINK OVER BAND Y

FIG. 3

—————— FIBER CONNECTIVITY
— — — — LOGICAL CONNECTIVITY PROVIDED BY L2 SERVICE PER TRAIN
— · — · — RADIO LINK OVER BAND X
················ RADIO LINK OVER BAND Y

COMMUNICATION SERVICES TO A MOVING PLATFORM

CROSS-REFERENCE TO RELATED APPLICATIONS

This application claims priority of Israel Patent Application No. 224331, filed Jan. 20, 2013, the disclosure of which is incorporated by reference herein in its entirety.

TECHNICAL FIELD

The invention relates to a system and a method for fast handover in a communication network, and in particularly to a system and a method for carrying out fast switching in communication networks which are MPLS compatible.

BACKGROUND

Modern communications and data networks comprise nodes that enable transport of data through the network. Such nodes may include routers, switches, bridges, or combinations thereof, for conveying the individual data packets or frames through the network. Some networks may offer data services that forward data frames from one node to another node across the network without using pre-configured routes on the intermediate nodes. Other networks may forward the data frames from one node to another node across the network along pre-configured or pre-established paths. In some networks, the nodes may create Ethernet-Local Area Network (E-LAN) services, where traffic that corresponds to different services may be transported along different sub-networks (e.g., by different subsets of nodes).

Due to the demand for high speed data transport and the ability to support high-bandwidth transmission rates, many data network devices are deployed with the capability to carry out switching by Layer-2 hardware. Layer-2 switching devices may be deployed for example to alleviate switching bottlenecks within subnets of a LAN environment. Multi-protocol Label Switching (MPLS) is an Internet Engineering Task Force (IETF)-specified framework that provides for the efficient designation, routing, forwarding, and switching of traffic flows through a network. In an MPLS network, a label edge router (LER) assigns a suitable "label" to incoming packets, and the packets are forwarded along a label switch path (LSP) where label switch routers (LSRs) makes forwarding decisions based solely on the contents of the label and the port through which the packet arrived. At each hop, the LSR would strip off the existing label, and would apply a new label to inform the next hop how to forward the packet.

LSPs are established by network operators for a variety of purposes, such as to guarantee a certain level of performance, to route around network congestion, or to create tunnels for network-based virtual private networks (VPNs). An LSP can be established using MPLS that crosses multiple Layer-2 transporting systems such as ATM, Frame Relay, or Ethernet.

Hand-over in a cellular network is a well known technique in the art. It is handled in a timely manner via dynamic protocols like 3GPP, SCTP, and the like. However, no adequate solution has yet been proposed for pure L2/MPLS-TP type of networks for carrying out handover of a moving network element ("ME") (e.g. a train) that moves between stations.

CN101820655A for example has made an attempt to address this issue. The publication describes a method for realizing Radio Block Center (RBC) soft handoff in a train control system of the type CTCS-3. The method separates a radio communication network (GSM-R) access function in RBC and integrates the function into a device called as an RBC communication gateway, a vehicle-borne Automatic Train Protection (ATP) and the RBC communication gateway keep always-on-line circuit link, and the RBC communication gateway and related RBC are linked by adopting the manner of Ethernet plus TCP/IP. When receiving a data packet of the vehicle-borne ATP, the RBC communication gateway carries out RBC according to the ID of the RBC contained in a header and determines to which RBC the data packet should be re-transmitted. As ground link is a virtual link based on TCP, the vehicle-borne ATP can communicate with a plurality of RBCs through one link, thus achieving the RBC handoff. Unfortunately, the solution provided by this publication is not sufficient to overcome the problems at hand.

SUMMARY OF THE DISCLOSURE

The disclosure may be summarized by referring to the appended claims.

It is an object of the present invention to provide a method and apparatus to enable providing point to multi point (P2MP) communication services at a mobile platform, such as a train.

It is another object of the present invention to provide a method and apparatus to enable provisioning of communication services while the mobile platform is handed over from one network gateway to the other.

It is still another object of the present invention to provide a method and apparatus to enable provisioning of the communication services in Layer 2 (L2), thereby allowing a smoother switching over from one network gateway to another.

Other objects of the present invention will become apparent from the following description.

According to a first embodiment there is provided a method for providing communication services to a mobile platform while moving, wherein the mobile platform is adapted to communicate at any given time along two current communication links each extending between the mobile platform and a respective network gateway, wherein the method comprising the steps of:

setting an H-VPLS service to enable provisioning of Layer-2 (L2) services to the moving platform via at least one of the two current communication links connecting the moving platform with the two network gateways;

enabling the moving platform to exchange communications along one or both current communication links;

while the mobile platform is moving, replacing one of the two current communication links with another communication link extending towards a third network gateway, by using Pseudo Wire Redundancy (PWR) to re-route traffic from the communication link being replaced to the other communication link, thereby enabling the moving platform to continue provisioning the L2 services while communicating with two network gateways, now being the third network gateway and one of the former two network gateways.

As will be appreciated by those skilled in the art, each of the terms "mobile platform", "moving platform", "moving train", "moving element" and the like, as used herein throughout the specification and claims should be understood to encompass a communication apparatus comprised therein, irrespective of whether such a communication apparatus is specifically referred to or not, so that all communication operations described herein can be carried out by the above mobile/moving platforms.

According to another embodiment, the step of replacing one of the two current communication links with another communication link is carried out in an MPLS network.

By yet another embodiment, each of the two current communication links is a different band of Ethernet radio link, wherein one of the two current communication links extends towards a network gateway located geographically ahead of the moving platform with respect to its moving direction and the other one of the two current communication links extends towards a network gateway located geographically behind the moving platform with respect to its moving direction.

In accordance with still another embodiment, the step of replacing one of the two current communication links with another communication link is carried out upon meeting a pre-defined criterion. For example, the pre-defined criterion may be selected from among a group that consists of: a) in case the connection of the mobile platform with at least one of the two network gateways is lost, b) in case the quality of the connection of the mobile platform with at least one of the two network gateways has deteriorated and is less than a pre-defined threshold, c) in case the quality of the connection of the mobile platform with at least one of the two network gateways is less than the quality of the connection of the mobile platform with a network gateway located in front of the moving platform and is in its forward moving direction, d) in accordance at least one pre-determined priority rule, and e) any combination thereof.

By yet another embodiment, the mobile platform is a train and each of the two network gateways is located at a different train station, wherein the two different train stations are successive stations located along the train's travelling direction.

According to another embodiment, each of the two network gateways is connected to a different service center from the other. Preferably, this embodiment of the method provided, further comprises a step of sending to the two service centers a MAC address to enable each of the service centers to identify a network gateway through which communications may be conveyed from the respective service center to the mobile platform.

In accordance with another embodiment, the network gateway which is associated with the MAC address received by the service centers is a network gateway that is connected to the moving platform but is not currently active to exchange communications with that mobile platform.

According to still another embodiment, the MAC address is derived from an Ethernet MAC encapsulation of an MPLS packet received at the two service centers, and is independent of the path along which that packet was conveyed.

By yet another embodiment, only one pseudo wire (PW) is used to re-route traffic from the current communication link being replaced to the other communication link.

According to another aspect there is provided a communication apparatus adapted to operate at a mobile platform by communicating at any given time along two current communication links, each extending between the currently moving platform and a respective network gateway, wherein the communication apparatus comprises:

one or more transceivers are operative to communicate with two network gateways at any given time while the mobile platform is moving in order to provide Layer-2 (L2) services to the moving platform via at least one of the two current communication links currently connecting the moving platform with the two network gateways;

a processor operative to determine while the mobile platform is moving, whether one of the two communication links should be replaced with another communication link extending towards a third network gateway; and wherein the one or more transceivers is operative by using Pseudo Wire Redundancy (PWR) to re-route traffic from the current communication link being replaced to the other communication link, thereby enabling to continue provisioning L2 services while communicating with two network gateways, being the third network gateway and one of the former two network gateways.

Optionally, the communication apparatus further comprises a router.

Other aspects of the present invention such as certain features of the communication apparatus and system for serving the mobile platform and which are adapted to operate in accordance with the principles described herein, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Although the following example relates to the implementation of the method provided by an embodiment of the disclosure in a train railway network, it should be understood as being limited to trains as the mobile platform.

Let us assume we have a train railway network that comprises 40 train stations, and trains that move within that railway system from one station to the next.

Figure 1:
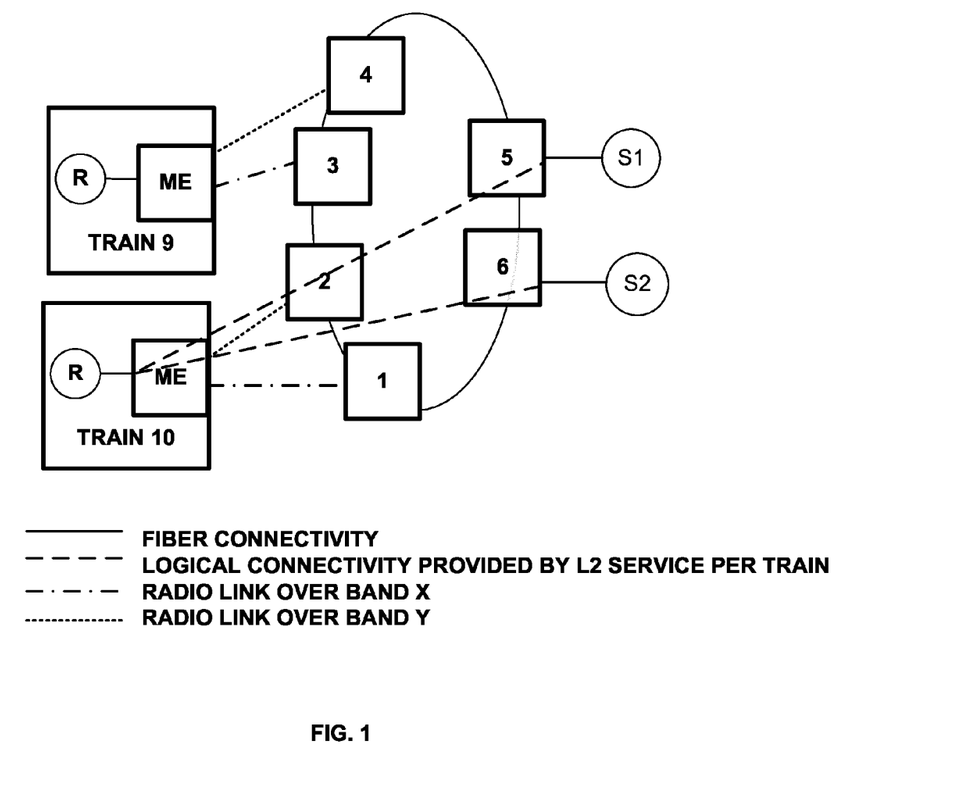
FIG. 1—illustrates part of a Train-to-Wayside Communication System (TWOS)

FIG. 1 illustrates a part of a Train-to-Wayside Communication System (TWOS), which comprises 6 network gateways numbered 1-6 connected by an optical fiber and arranged in a ring type configuration, and two service centers S1 and S2. Network gateways 1, 3 and 5 are configured to communicate with trains that pass by, along a radio link while using a certain frequency band, say x band, whereas Network gateways 2, 4 and 6 are adapted to communicate with trains that pass by, along a radio link utilizing another frequency band, say y band. The illustrated system further comprises two trains (train No. 9 and train No. 10), each connected to a different gateway using a different frequency band. Train 9 is connected to network gateway 3 via the radio link operating at frequency band x and to network gateway 4 via the radio link operating at frequency band y. Similarly, train 10 is connected to network gateway 1 (GW A) by the radio link operating at frequency band x and to network gateway 2 (GW B) by the radio link operating at frequency band y. In order to be provided with communication services, there is a logical connection extending from train 10 via network gateway 2, along the ring, through network gateway 5, to service center S1, while another logical connection extending from train 10 via network gateway 1, along the ring, through network gateway 6 to service center S2. The communication services, being point to multi-point, L2 services are provided along these connections using H-VPLS service. In addition, each of the trains is connected via a Pseudo Wire to the two network gateways (GW-A, GW-B).

The network is arranged in such a way, that any two successive stations behave as GW-A and GW-B with respect to a single moving train. Optionally, all network elements in the chain/ring system have the same service/tunnel/OAM configuration with respect to the moving trains in an interleaved manner as demonstrated in FIG. 1 (wherein all odd numbered network gateways will act as GW-A and all even numbered network gateway will act as GW-B).

Figure 2:
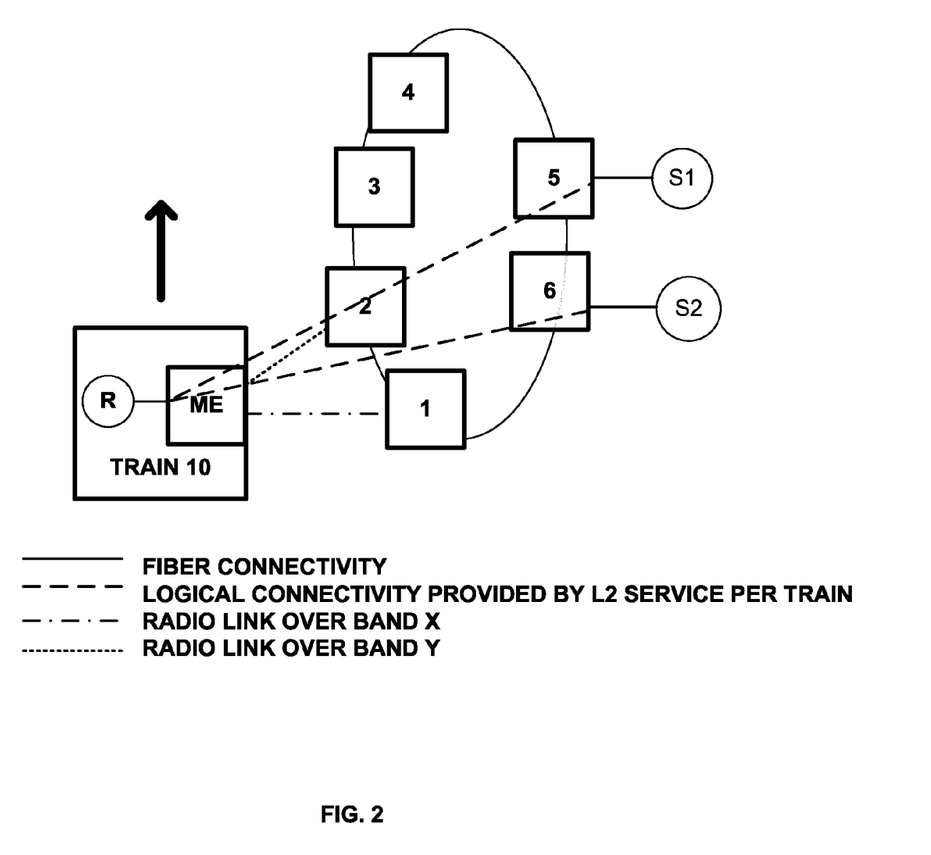
FIG. 2—illustrates a train which has just started its movement in the forward direction.

FIG. 2 focuses on train 10 which has started moving in the forward direction, and is still connected to the two network gateways 1 and 2 (GW-A and GW-B, respectively), and through them to service centers S1 and S2, respectively, as shown in FIG. 1.

Figure 3:
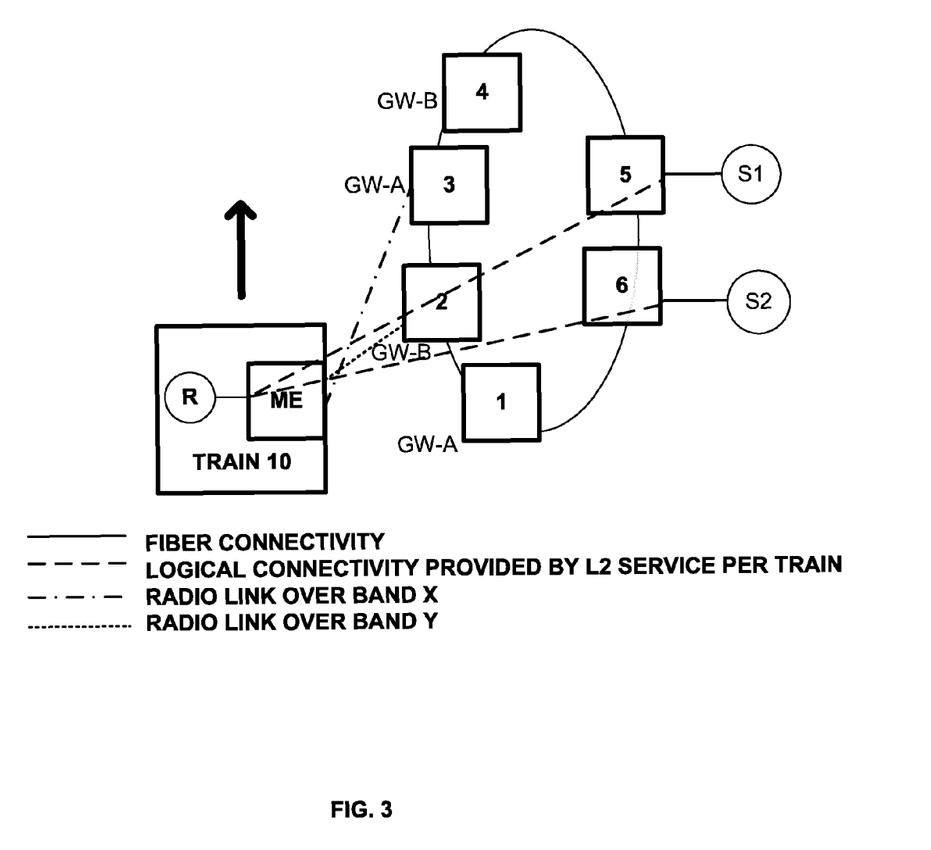
FIG. 3—illustrates a scenario where the moving train is on its way towards the next train station.

Now, let us turn to FIG. 3 which illustrates the situation where moving train 10 is on its way towards the next train station. At this point of time, train 10 is still connected by network gateway 2 (GW-B) to service center S1, but its connection to network gateway 1 has been disconnected. Instead, the train becomes connected to network gateway 3 (now new GW-A), thereby providing the connection with service center S1, still through network gateway 5. Preferably, the decision for carrying out the re-routing (or switching) from network gateway 1 to network gateway 3 is taken by the moving element, which selects the forwarding GW according to pre-defined priority rules and/or according to the quality of communications received from the GW (e.g. by determining if network gateway 1 is still active from the moving element perspective). However, it should be emphasized that according to this example, at any given moment there are two GWs which are available and wirelessly connected to the moving element.

Figure 4:
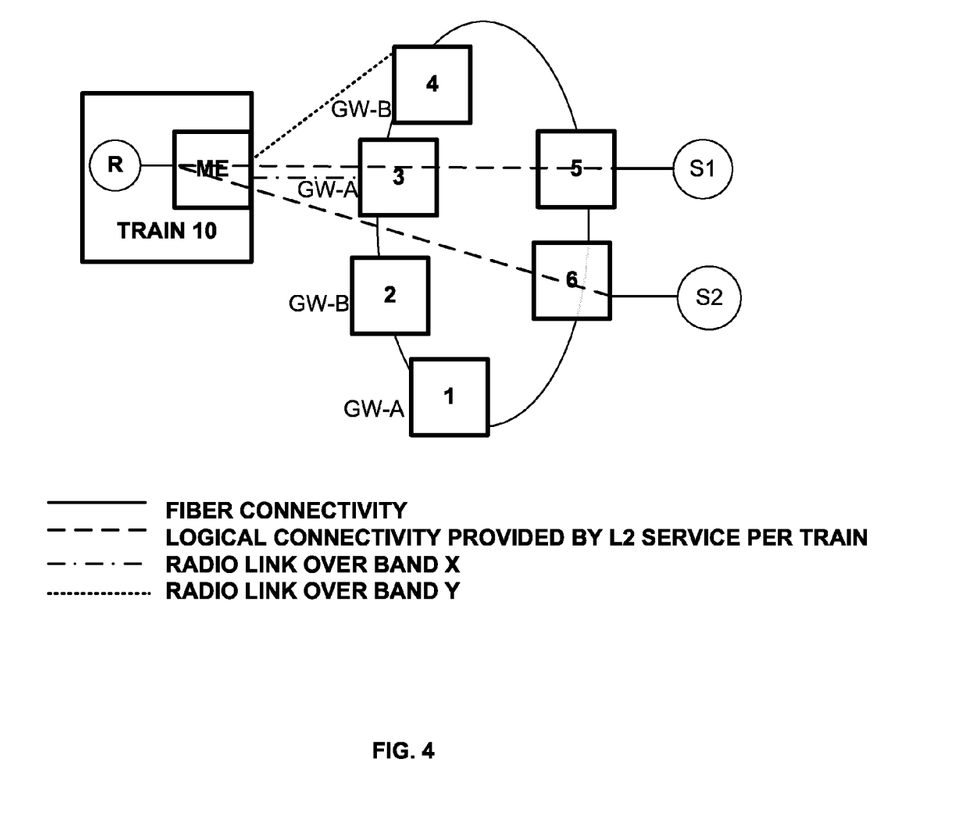
FIG. 4—demonstrates a scenario where the moving train continues its way towards the one after next train station.

FIG. 4 illustrates the situation where moving train 10 continues its way forward. At this stage, train 10 is still connected by network gateway 3 (GW-A) to service center S1, but now its connection with network gateway 2 is disconnected, and instead, the moving train becomes connected to network gateway 4 (now new GW-B) which provides the connection with service center S2, still through network gateway 6. Again, the decision for carrying out the re-routing (or switching) from network gateway 2 to network gateway 4 is preferably taken at the moving train, by selecting the forwarding GW in accordance with pre-defined priority rules and/or depending on whether or at what quality, are communications received from the old GW before switching to the new GW.

Figure 5:
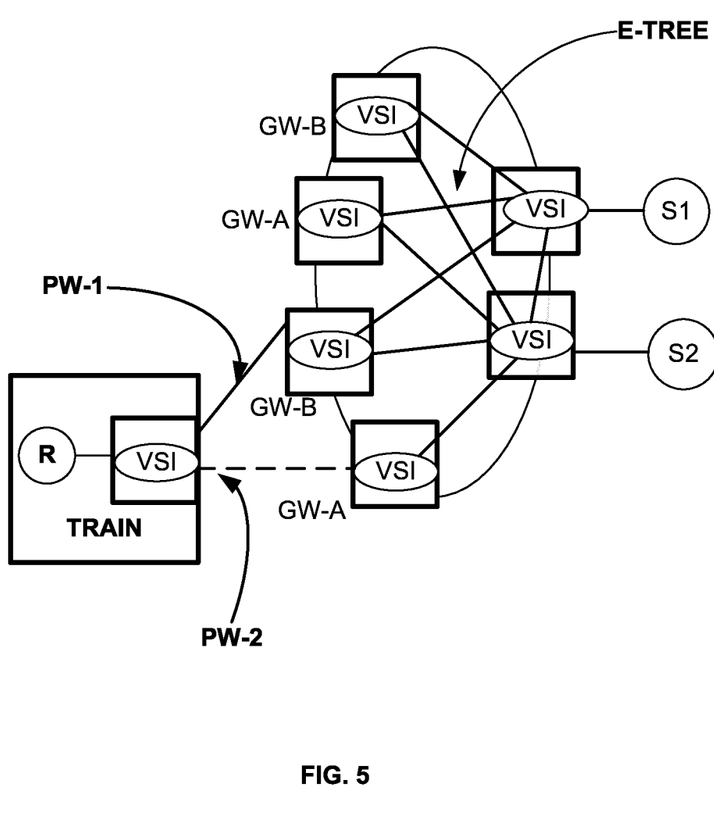
FIG. 5—illustrates an L2 VPN E-tree structure to which the moving train belongs.

FIG. 5 illustrates an L2 VPN E-tree structure to which the communication apparatus (e.g. comprised in a moving train) belongs. The E-tree in this example comprises an H-VPLS network with pseudo wires arranged in a partial mesh configuration.

There are several options known in the art for managing such a network with certain constrains characterizing them. For example:
1. G.8031 1+1. This solution is not too efficient from the bandwidth point of view in a ring configuration.
2. LAG (Link Aggregation Group [IEEE 802.1AX}) 1:1 at the communication apparatus of the moving platform. This solution however is associated with cumbersome multi-chassis LAG configuration at GW, and is the equivalent to PW redundancy.
3. STP/G.8032 at ME. This solution requires protocol involvements at GW.
4. PB (Provider Bridge, IEEE 802.1ag) in the ring. This solution requires E-tree topology, and typically is not applicable in an E-LAN configuration.
5. Simple Control Transmission Protocol (SCTP) tunnels extended between the communication apparatus of the moving platform and the Wayside (multi-homing). This option requires establishing a communication protocol between the MCE (Mobile Communication Equipment) of the moving platform and the WCE (Wayside communication equipment).

In the example illustrated in FIG. 5, the links connecting the moving platform with GW-A and GW-B comprise primary and secondary pseudo wires. The network is arranged in a moving leaf topology and BD-LSP providing fast Ethernet OAM and Bidirectional Forwarding Detection (BFD) for detecting failures. The term "OAM", being Operations, Administration and Management, and encompasses processes, activities, tools, standards, etc. involved with operating, administering, managing, and maintaining the Ethernet system.

Figure 6:
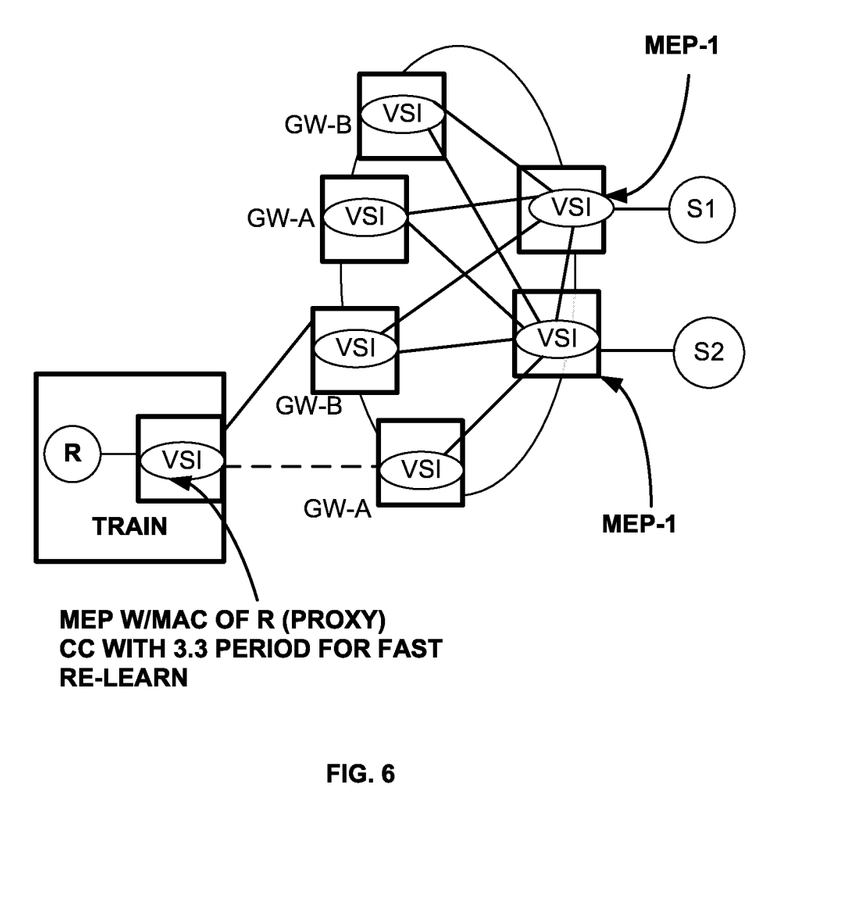
FIG. 6—demonstrates an example of using Maintenance association End Point ("MEP") with a proxy MEP in order to enable fast re-learning of addresses for switching communication links in the system.

FIG. 6 demonstrates an example of using Maintenance association End Point ("MEP") with a proxy MEP in order to enable fast re-learning while still maintaining simple IP configuration. A MEP is a point located at the edge of the domain, which defines the boundary for the domain. A MEP sends and receives CFM frames through the relay function, drops all CFM frames of its level or lower that come from the wire side.

One way of achieving fast re-learning may be for example by creating a CFM CCM session while utilizing the MAC address of the embedded Router. The IEEE 802.1ag Ethernet CFM ("Connectivity Fault Management") protocols comprise three protocols that work together to help administrators debug Ethernet networks, among which is, the Continuity Check Protocol (CCP). The Continuity Check Message (CCM) provides a means to detect connectivity failures. CCMs are multicast messages which are confined to a domain (MD). These messages are unidirectional and do not solicit a response.

According to this example, a MAC address is transmitted towards both network gateways, connecting the two service centers with the ring demonstrated, where these two network gateways act as MEP-1 proxy of the moving platform MEP, so that the relevant service center is able to identify a network gateway through which communications will be conveyed from/to the mobile platform.

Preferably, the service center receiving the message being an Ethernet MAC encapsulation of an MPLS packet MAC address is operative to retrieve the MAC address therefrom, and use it independently of the path along which that packet was conveyed.

Preferably, only one pseudo wire (PW) is used to re-route traffic from the communication link being replaced by the other communication link.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for providing communication services to a train while the train is moving, the method comprising the steps of:
    establishing communication links between a first and a second network gateways to the moving platform via a first and a second communication links, wherein the first communication link is configured to enable exchange of communications between the moving train and the first network gateway and the second communication link is configured to enable exchange of communications between the moving train to the second network gateway;
    setting Hierarchical-Virtual Private LAN (Local Area Network) Services (H-VPLS) to enable provisioning of Layer-2 (L2) services to the moving train via at least one of said first and second communication links; and
    while the train is moving, replacing the first communication link with a third communication link configured to enable exchange of communications between the moving train and a third network gateway, by using Pseudo Wire Redundancy (PWR) to re-route traffic from the first communication link to the third communication link while the train is still in communication with the second network gateway via the second communication link,
    allowing to provide continuous L2 services to said moving train while communicating with the second network gateway, and
    ensuring that the moving train is in communication with two different network gateways at any given time while the train is moving, wherein each of the two network gateways is in communication with the moving train along a communication link that extends between the moving train and a respective network gateway, said communication link being different from a communication link that extends between the moving train and the other one of the two network gateways.

2. The method of claim 1, wherein the step of replacing the first communication link with the third communication link, is carried out in an MPLS network.

3. The method of claim 1, wherein the step of replacing the first communication link with the third communication link, is carried out upon meeting a pre-defined criterion.

4. The method of claim 3, wherein the pre-defined criterion is selected from the group consisting of: a) in case the connection of the train with the first network gateway is lost, b) in case quality of the connection of the train with the first network gateway has deteriorated and is less than a pre-defined threshold, c) in case quality of the connection of the train with the first network gateway is less than the quality of the connection of the train with the third network gateway located in front of the moving train and is in its forward moving direction, d) in accordance with at least one pre-determined priority rule, and e) any combination thereof.

5. The method of claim 1, wherein the first communication link has a different band of Ethernet radio link than the second communication link.

6. The method of claim 1, wherein each of the first, second, and third network gateways is located at different train stations, and wherein the train stations are located successively.

7. The method of claim 1, wherein each of the first and second network gateways is connected to a service center different from the other.

8. The method of claim 7, further comprising a step of sending to at least two service centers, a MAC address that enables the two service centers to identify a network gateway through which communications will be conveyed from each of the two service centers to the train.

9. The method of claim 8, wherein the network gateway which is associated with the MAC address that was sent to the two service centers, is a network gateway that is connected to the moving train but is not currently active to exchange communications with said train.

10. A method for providing communication services to a mobile platform while moving, the method comprising the steps of:
    establishing communication links between a first and a second network gateways to the moving platform via a first and a second communication links, wherein the first and second network gateways is connected to a service center different from the other, the first communication link is configured to enable exchange of communications between the moving platform and the first network gateway, and the second communication link is configured to enable exchange of communications between the moving platform to the second network gateway;
    sending to at least two service centers, a MAC address that enables the two service centers to identify a network gateway through which communications will be conveyed from each of the two service centers to the mobile platform, wherein said MAC address is derived from an Ethernet MAC encapsulation of an MPLS packet received at both the first and second network gateways, and is independent of the path along which that packet was conveyed;
    setting Hierarchical-Virtual Private LAN (Local Area Network) Services (H-VPLS) to enable provisioning of Layer 2 (L2) services to the moving platform via at least one of said first and second communication links; and
    while the mobile platform is moving, replacing the first communication link with a third communication link configured to enable exchange of communications between the moving platform and a third network gateway, by using Pseudo Wire Redundancy (PWR) to re-route traffic from the first communication link to the third communication link while the mobile platform is still in communication with the second network gateway via the second communication link.

11. The method of claim 1, wherein only one pseudo wire (PW) is used to re-route traffic from the first communication link to the third communication link.

12. A communication apparatus adapted to operate at a train, wherein the communication apparatus comprises:
one or more transceivers operative to communicate with a first and a second network gateways at any given time while the train is moving, via a first and a second communication links, wherein the first communication link is configured to enable exchange of communications between the moving train and the first network gateway and the second communication link is configured to enable exchange of communications between the moving train to the second network gateway, in order to provide Layer 2 (L2) services to the moving train;
a processor operative to determine, while the train is moving, whether the first communication link should be replaced with a third communication link configured to enable exchange of communications between the moving train and a third network gateway; and
wherein the one or more transceivers is operative by using Pseudo Wire Redundancy (PWR) to re-route traffic from the first communication link to the third communication link while the train is still in communication with the second network gateway via the second communication link, allowing to provide continuous L2 services to said moving train while communicating with the second network gateway and ensuring that the moving train is in communication with two different network gateways at any given time while the train is moving, wherein each of the two network gateways is in communication with the moving train along a communication link that extends between the moving train and a respective network gateway, said communication link being different from a communication link that extends between the moving train and the other one of the two network gateways.

13. The communication apparatus of claim 12, wherein the first communication link has a different band of Ethernet radio link than the second communication link.

14. The method of claim 1, wherein the moving train exchange communications along both the first and second communication links.

15. The method of claim 1, wherein the moving train exchange communications along one of the first communication link, the second communication link, or the third communication link.

* * * * *